April 18, 1967  F. G. FREEMAN  3,314,697
PIPE COUPLING HAVING CONCENTRIC SPHERICAL SURFACES
Filed April 27, 1964
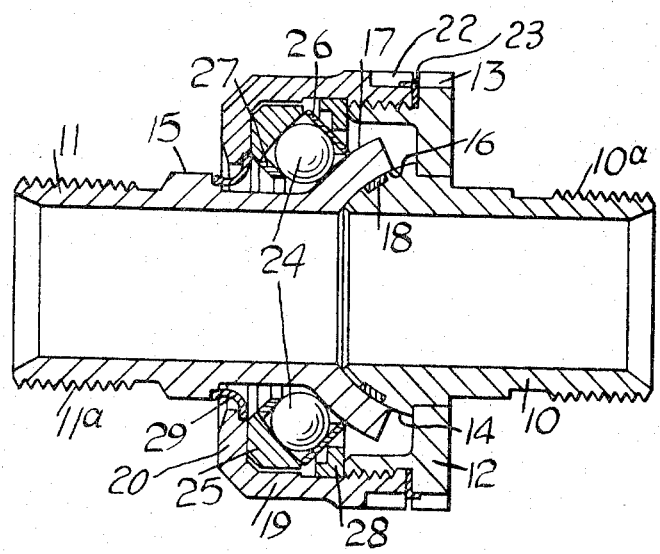

United States Patent Office 3,314,697
Patented Apr. 18, 1967

3,314,697
PIPE COUPLING HAVING CONCENTRIC SPHERICAL SURFACES
Frank George Freeman, Solihull, England, assignor to Joseph Lucas (Industries) Limited, Birmingham, England
Filed Apr. 27, 1964, Ser. No. 362,607
Claims priority, application Great Britain, May 1, 1963, 17,107/63; June 18, 1963, 24,176/63
1 Claim. (Cl. 285—263)

This invention relates to pipe couplings which permit of limited relative angular movement between a pair of pipes to be joined thereby, the coupling being of the kind comprising first and second members adapted for respective connection to the pipes to be joined, and having means permitting relative movement therebetween without leakage.

This form of coupling, when used for connecting pipes carrying high pressure fluid, has, in the past, suffered from the disadvantage that the parts of the coupling have tended to lock together, thereby reducing the flexibility of the coupling.

The object of the present invention is to provide a coupling of the kind specified in a convenient form in which this disadvantage is minimised.

An example of the invention will now be described with reference to the accompanying drawing which is a cross-sectional side elevation view of one form of coupling.

Referring to the drawing, the coupling comprises a first tubular member 10 and a second tubular member 11, each being provided with an externally screw-threaded end portion, 10a, 11a respectively, whereby the members can be respectively connected to a pair of pipes to be joined.

The first member 10 has a separate external ring portion 12 which is externally screw-threaded and also has a castellated portion 13, or other non-circular formation, for engagement by a spanner. The member 10 is also formed, at its end remote from the screw-threaded end 10a, on the external surface of the member, with a part-spherical portion 14.

The second member 11 has an external hexagonal portion 15 or other non-circular formation for engagement by a spanner intermediate its ends and has a flared end portion remote from the screw-threaded end 11a. Inner and outer surfaces of the flared portion are formed with respective coaxial part-spherical portions 16, 17. In the inner part-spherical portion is formed an annular groove containing a sealing ring 18.

Mounted on the second member 11 is a retaining ring 19 which is rotatable relative to the second member and has an inwardly directed annular flange portion 20 in which is located a ring 25 having an internal part-spherical surface and of generally triangular cross-sectional shape. Between the part-spherical surface of the ring 25 and the part-spherical surface 17 of the second member 11, when the coupling is assembled, is a row of caged balls 24.

The retaining ring 19 also has an internal screw threaded portion at its end remote from the flange 20 and this end is also externally castellated or otherwise formed, at 22 for engagement by a spanner. The internal screw-thread on the retaining ring 19 is engageable with the screw-thread on the ring portion 12 of the first member 10 and a washer 23 is provided between these two parts.

Between the surface 17 of the second member 11 and the part-spherical surface of the ring 25 is a row of balls 24. The cage for the balls comprises a pair of rings 26, 27 and the ring 26 is corrugated and secured, between adjacent balls 24, to the ring 27. The ring 26 abuts against an L cross-sectional ring 28 formed from a resilient material to prevent substantial movement of the cage assembly relatively to the retaining ring 19 and member 11. It is however necessary to provide for some small movement which is accommodated by the resilience of the ring 28.

Between the retaining ring 19 and the second member 11 is a sealing device 29 formed as a curved cross-sectional resilient ring. The sealing ring 18 between the first and second member is, in this form, in a groove in the first member 10.

In use the flared portion of the second member 11 is trapped between the complementary part-spherical portion 14 of the first member 10 and the row of caged balls 24. Thus a limited angular movement is permitted and even if the pipes are carrying high pressure fluid, the anti-friction bearing tends to prevent locking together of the relatively slidable surface portions.

Having thus described my invention what I claim as new and desire to secure by Letters Patent is:

A pipe coupling capable of permitting relative angular movement between a pair of pipes to be joined thereby, and comprising first and second members adapted for respective connection to the pipes to be joined, a retaining ring mounted on the second member and engageable with the first member, said first member terminating in a part spherical convex surface, said second member terminating in a flange having one concave part spherical face engageable with said spherical terminus of said first member and complementary thereto, the other surface of said flange being a part spherical surface concentric with said one concave part spherical surface, said retaining ring being provided with a race having a concave surface, and a set of caged balls engaging said other surface of said flange and said concave surface of said race, and means for limiting the travel of said caged balls about the common center of said spherical surfaces, the surface of said race lying in a sphere concentric with said one and said other surface of said flange, whereby said retaining ring presses said complementary part spherical surfaces of said first and second members together under all conditions of relative angular movement.

References Cited by the Examiner
UNITED STATES PATENTS

| | | | |
|---|---|---|---|
| 2,158,131 | 5/1939 | Laurent | 285—267 |
| 2,424,897 | 7/1947 | Orshansky | 285—266 X |
| 2,465,373 | 3/1949 | Hall | 285—263 X |
| 2,812,915 | 11/1957 | Davies et al. | 287—12 |
| 2,931,672 | 4/1960 | Merritt et al. | 255—266 X |
| 3,033,595 | 5/1962 | Bard | 285—263 |
| 3,165,339 | 1/1965 | Faccou | 285—263 |
| 3,232,642 | 2/1966 | Cleff et al. | 285—114 |

FOREIGN PATENTS
854,641  11/1960  Great Britain.

CARL W. TOMLIN, *Primary Examiner.*
THOMAS F. CALLAGHAN, *Examiner.*
T. A. LISLE, *Assistant Examiner.*